July 1, 1958 — I. SPINNER ET AL — 2,840,834
INSERTER FOR PLASTIC BINDERS
Filed Feb. 2, 1953 — 4 Sheets-Sheet 1

Inventors:
Isidore Spinner
August J. Braun
By: Morris Spector
Attorney

July 1, 1958     I. SPINNER ET AL     2,840,834
INSERTER FOR PLASTIC BINDERS
Filed Feb. 2, 1953     4 Sheets-Sheet 2
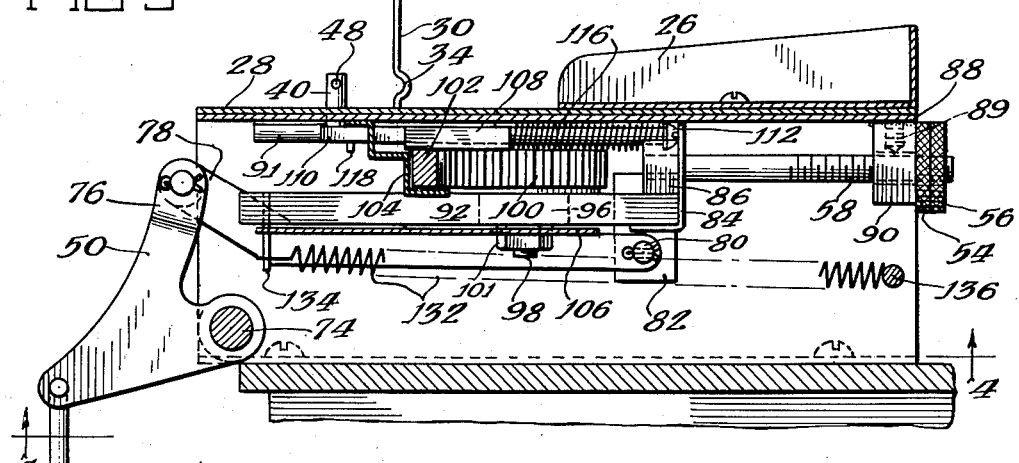
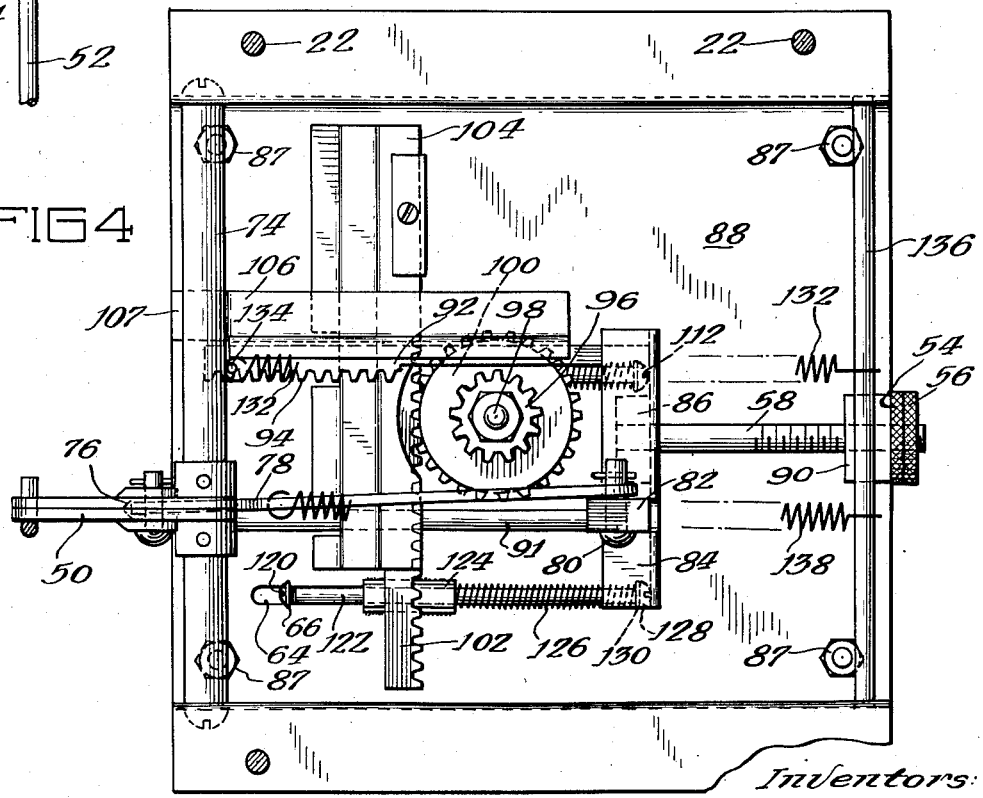
Inventors:
Isidore Spinner
August J. Braun
By Morris Spector
Attorney July 1, 1958  I. SPINNER ET AL  2,840,834
INSERTER FOR PLASTIC BINDERS
Filed Feb. 2, 1953  4 Sheets-Sheet 3
FIG.5
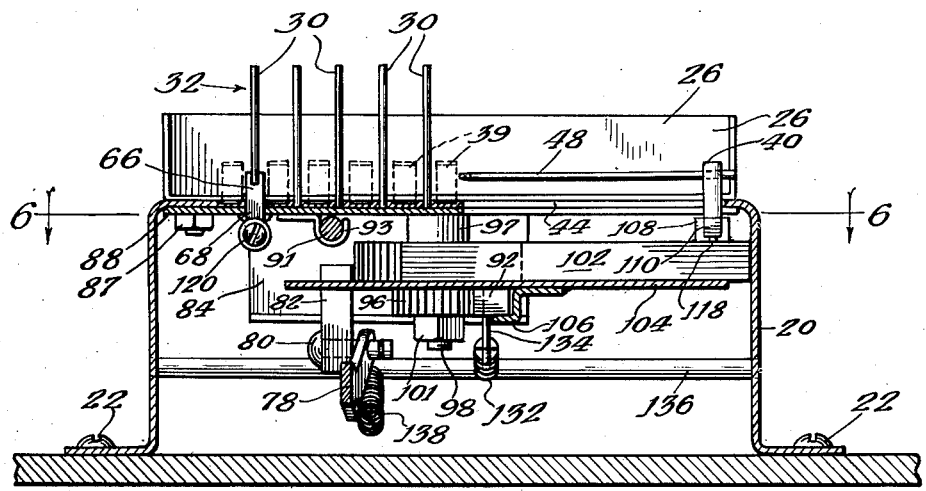
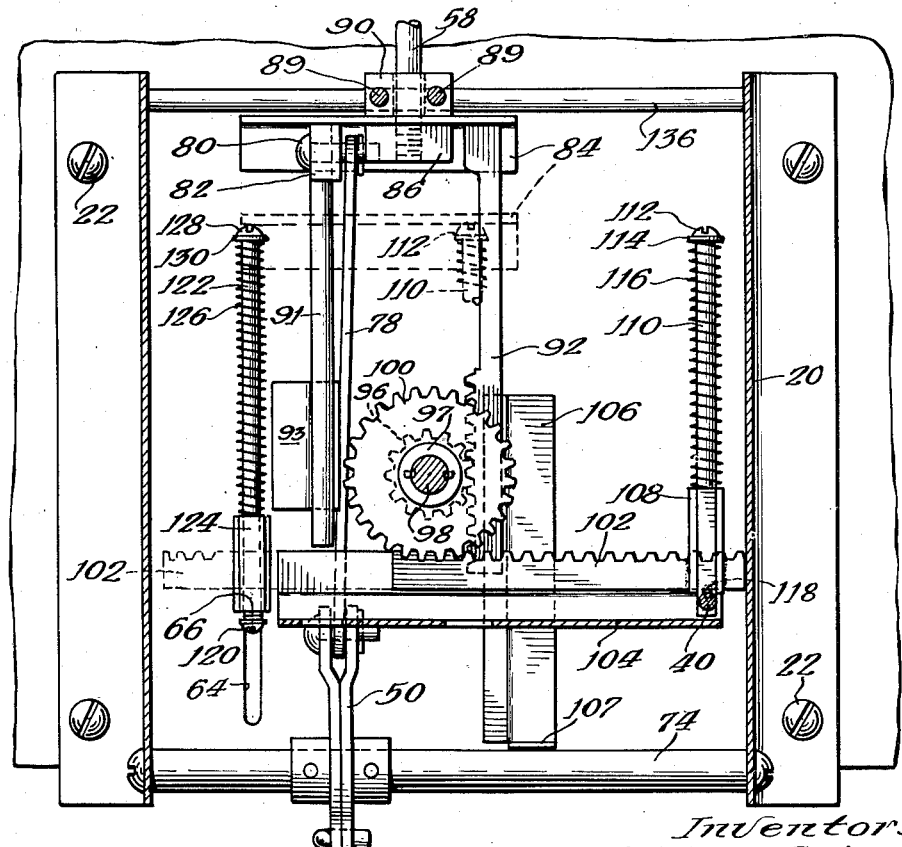
FIG.6
Inventors:
Isidore Spinner
August J. Braun
By Morris Spector
Attorney

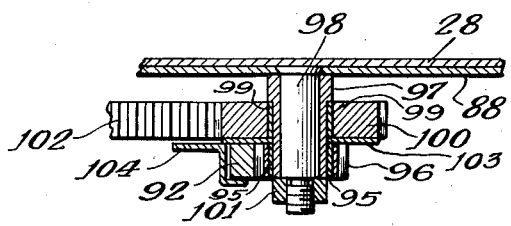
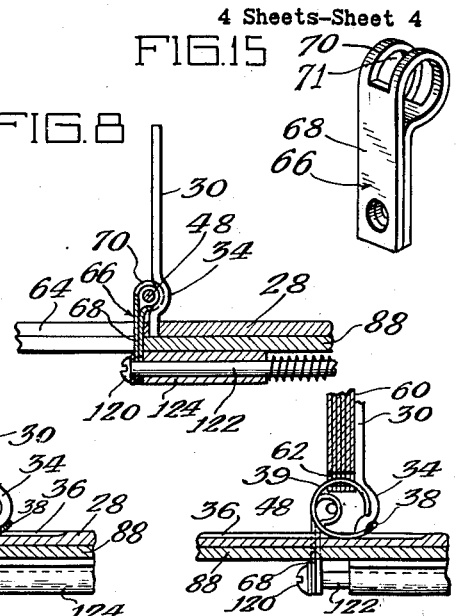
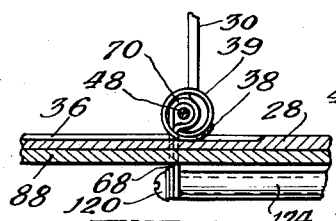
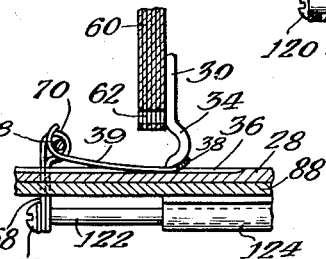
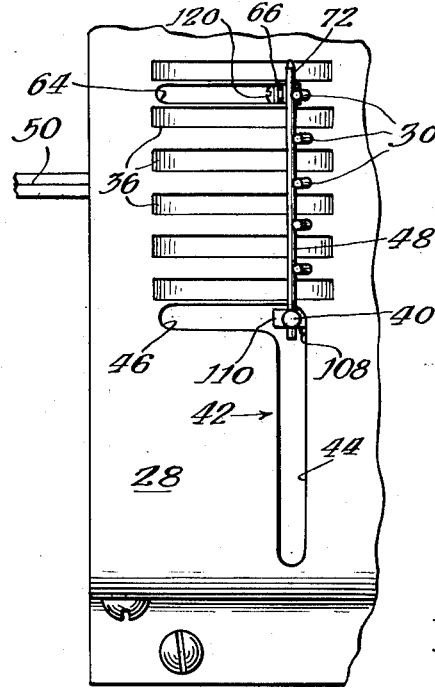
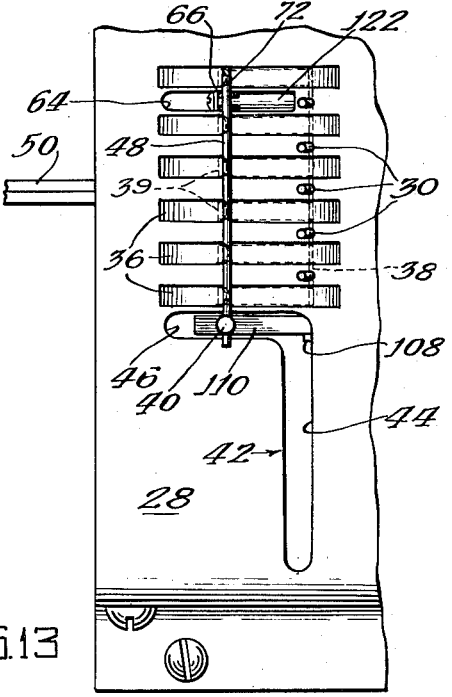

United States Patent Office 2,840,834
Patented July 1, 1958

2,840,834
INSERTER FOR PLASTIC BINDERS

Isidore Spinner and August J. Braun, Chicago, Ill., assignors to Plastic Binding Corporation, Chicago, Ill., a corporation of Delaware Application February 2, 1953, Serial No. 334,472

8 Claims. (Cl. 11—1)

This invention relates to machines for binding books or other sheaves of paper, or other material, by means of resilient plastic tubular binders of the type shown, for example, in the patent to Spinner and Dahly, issued April 22, 1952, No. 2,593,805, and other patents therein cited. Representative of the types of binders which can be used with the present machine is the type which is made of resilient plastic material and consists of a backbone having a number of fingers extending from one edge thereof, the fingers being curled to meet or overlap the opposite edge of the backbone, and thus assuming the shape of rings.

It is an object of the present invention to provide a machine for the insertion of plastic binders which is simple and inexpensive, and requires a minimum of manipulation on the part of the operator, thus rendering it economically suitable for use in places where only a small amount of binding is done.

The invention further affords a novel, simple mechanism for driving the finger-engaging member or members, which may be constructed at a minimum of expense. Additionally, in accordance with the invention, there is provided a novel type of support and drive for the finger-engaging member to minimize distortion of the finger-engaging member in the portion of the cycle of the machine wherein the fingers are being curled or uncurled.

The manner in which the above general objects are attained, together with other objects and advantages of the structure disclosed, will be readily understood by reference to the description of a preferred embodiment of the various features of the invention which is illustrated in the appended drawings, in which:

Figure 3 is a vertical sectional view corresponding to that of Figure 2 except that the parts are illustrated in the position wherein the finger-engaging member has been inserted through the fingers or rings of the binder and drawn away from the binder holder to spread the fingers;

Figure 4 is a bottom view of the machine, taken along the offset line 4—4 of Figure 3;

Figure 5 is a transverse vertical sectional view of the machine, taken along the line 5—5 of Figure 1;

Figure 6 is a horizontal sectional view of the machine, taken along the line 6—6 of Figure 5;

Figure 7 is a sectional view taken along the line 7—7 of Figure 1, illustrating details of a rack-and-pinion arrangement constituting a portion of the machine;

Figure 8 is a fragmentary sectional view taken along the line 8—8 of Figure 1;

Figure 9 is a fragmentary sectional view illustrating the manner in which a binder to be installed is mounted in the machine;

Figure 10 is similar to Figure 9, but illustrates the parts in the position in which the binder is uncurled;

Figure 11 is similar to Figures 9 and 10, but illustrates the parts in the position wherein the rings of the binder are recurling through apertures in a sheaf being bound;

Figure 12 is a fragmentary top plan view similar to a portion of Figure 1, but illustrating the parts in the position wherein the finger-engaging member has been positioned to extend through the fingers of the binder;

Figure 13 is a view similar to Figure 12, but illustrating the parts in the same position as in Figure 3;

Figure 14 is a fragmentary detail view illustrating the relation of a rack and pinion at a point in the cycle of the machine; and Figure 15 is an enlarged detail view of a support or pusher member constituting a part of the machine.

Reference may now be had more particularly to the drawings wherein like reference numerals designate like parts throughout.

Figure 1:
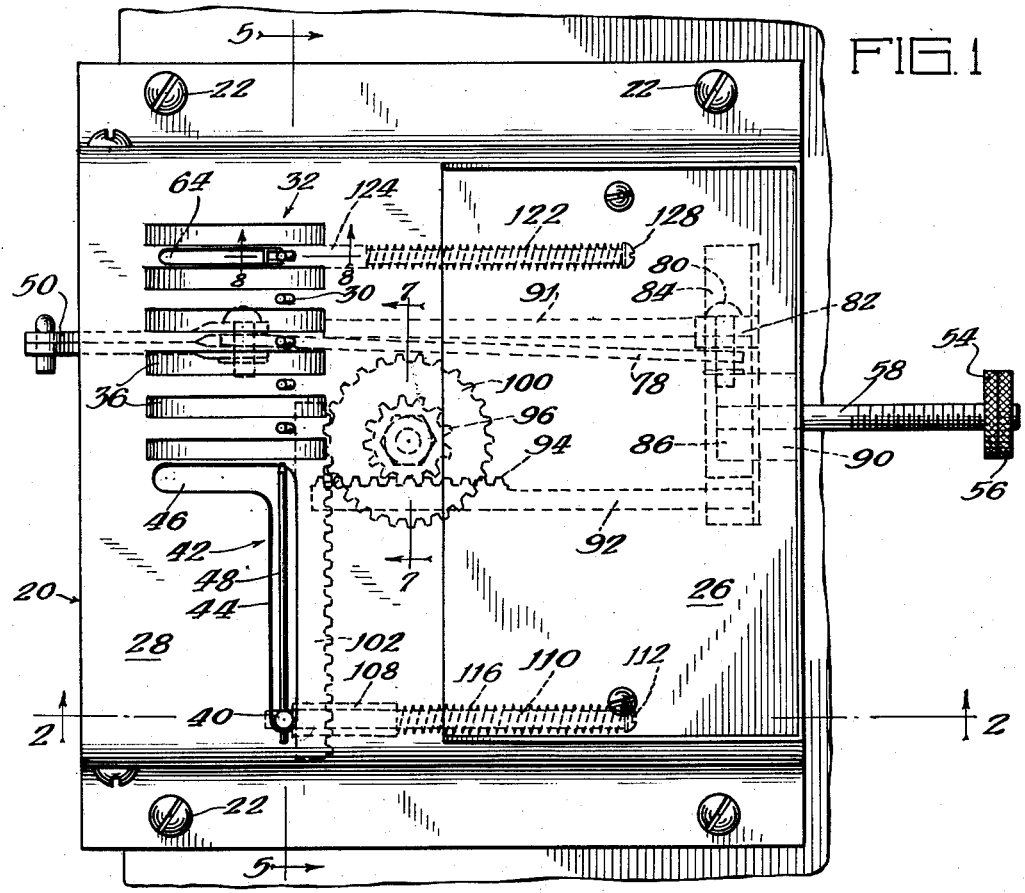
Figure 1 is a top plan view of a machine of the present invention for the insertion of plastic binders, illustrating the parts in the rest or quiescent condition.
Figure 2:
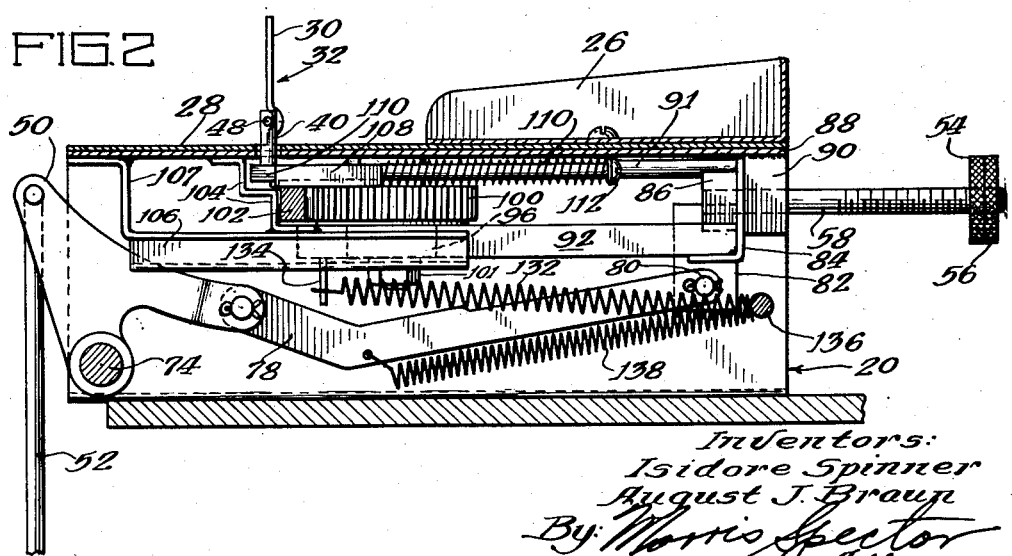
Figure 2 is a vertical sectional view of the machine, taken along the line 2—2 of Figure 1 in the direction indicated by arrows.

The machine is housed in an inverted channel-shaped housing 20 which may be secured by screws 22 to a table or other suitable support 24. At the rear of the top of the machine is an open-front tray 26 for the storage of a supply of binders which are thus readily available to the operator.

Extending upwardly from the work surface 28 of the housing 20 are a plurality of fixed laterally spaced parallel pins 30, collectively constituting a binder holder 32. The pins 30 have at the bottom thereof curved offset portions 34, the lower ends being in alignment with the upper portions. Extending forwardly from behind the pins 30 to a point substantially forward thereof are parallel slots or grooves 36 in the work-surface 28 between the pins 30. The grooves 36 extend between the respective pins 30 and adjacent to the outer pins and are of a width to receive the fingers of a binder. A binder is placed by the operator with the backbone 38 of the binder (Fig. 11) hooked under or over the offset portions 34, and is thus held securely by the pins when the rings 39 of the binder are engaged and uncurled, as hereinafter set forth. The provision of the offset portions 34 permits use of the machine with binders of small diameter, since when a binder is in position the clearance between the pins and the front portion of the binder is increased by the provision of the curved offset portions; the finger- or ring-engaging member must enter through this clearance and the increasing of this clearance permits the use of a finger-engaging member of much greater dimension than would be possible were straight pins employed as the binder holder 32.

Laterally spaced from the binder holder 32, and very slightly forward from exact alignment with the pins 30 is a support post 40, which extends upwardly through the outer end of an L-shaped slot 42. The slot 42 has a laterally extending portion 44, and a forwardly extending portion 46 at right angles thereto, the angle being adjacent to the endmost groove 36.

Extending through an aperture in the support post 40 is the finger-engaging member 48 in the form of an elongated rod or relatively stiff wire rigidly mounted on the support post 40. Within the housing 20, and extending from the front thereof, is a crank 50 attached by a drive rod 52 to a foot pedal (not illustrated). Upon actuation of the crank 50, the support post 40 and the finger-engaging member 48 are moved from the withdrawn position, illustrated in Fig. 1, along the laterally extending portion 44 of the slot 42. The finger-engaging member 48 thus progresses along the line of pins 30, opposite the offset portion 34, and in close proximity thereto, threading into the rings 39 of the binder until the support post 40 reaches the bend or angle of the L-shaped slot 42. Upon further actuation of the crank 50 the support post 40 and the finger-engaging member 48 move away from the pins 30 forming the binder holder 32, as shown in Fig. 13. The limit of this latter motion is fixed by adjustment of a knurled nut 54 which is locked in position by a knurled nut 56, both nuts being threaded on a rod 58 which extends from the rear of the housing 20. As shown in Figs. 9 and 10, the motion of the post 40 along the forwardly extending portion 46 of the slot 42 uncurls the fingers of a binder placed in the machine, the fingers being seated in the grooves 36. When the machine is in the position shown in Fig. 13, the fingers being uncurled and held relatively flat, the operator, as illustrated in Fig. 10, places the sheaf of photographs, papers, covers, or other materials to be bound, previously perforated to receive the fingers, against the front surfaces of the pins 30, somewhat elevating the perforated edge of the sheaf, so that upon release of the crank 50, the fingers of the binder recurl through the apertures 62 in the sheaf 60, as shown in Fig. 11. In the last portion of the return stroke of the crank 50, the finger-engaging member 48 is withdrawn from the binder and restored to the position of rest or disengagement.

Provision is made for supporting the free end of the finger-engaging member 48 as it is being pulled forwardly. Adjacent to that pin 30 which is most remote from the slot 42 is a forwardly extending slot 64 which is similar to the forwardly extending portion 46 of the L-shaped slot 42. Extending upwardly through the slot 64 is an additional support and pusher member 66 having an eye for receiving the end of the finger-engaging member 48. The member 66 is a strip of resilient metal bent to form an upwardly extending stem 68 and an eye 70 which is aligned to receive the finger-engaging member 48. The eye 70 is slotted at 71 to straddle the end pin 30 when the drive member 66 is in its most rearward position.

The mechanism hereinafter to be described permits the drive member 66 to remain in stationary position during the first portion of the stroke of the crank 50 while the finger-engaging member 48 is moved laterally along the row of pins 30. At the end of this portion of the stroke, the outer end 72 of the finger-engaging member or rod 48 is within the eye 70. Further actuation of the crank 50 moves the supplemental support and pusher member 66 forward through the slot 64 in a manner identical with the motion of the support post 40 through the forwardly extending portion 46 of the L-shaped slot 42. Thus, the elongated finger-engaging member 48, which is of a length to extend through all of the rings of the binder, is supported and driven at both ends. This structure substantially reduces the possibility of distortion or bending of the rod or finger-engaging member 48. Thus the finger-engaging member 48 may be made sufficiently small in diameter for use with even the smallest of the plastic binding members which are in current use. The slotting of the eye 70 preserves the advantage of the provision of the offset portion 34 in the pins 30 as discussed above, since in the absence of such slotting the entire thickness of the eye 70 would be subtracted from the clearance space available between the pins 30 and the forward portions of the binder.

The machine having been described from the point of view of the external structure and functioning thereof, the mechanism by which the various motions above described are obtained may now be described. The crank 50 is journalled on a rod or shaft 74 which extends across the housing 20. The crank is bifurcated at 76 and has a link 78 pivotally secured thereto. The opposite end of the link 78 is pivotally secured at 80 to a block 82, which is secured by welding to a sheet metal carriage 84, to which a block 86 is welded. The block 86 is threaded to receive the inner end of the rod or shaft 58 mentioned above. A plate 88 is fastened to the under surface of the work surface 28 of the housing by bolts and nuts 87. Screws 89 secure a guide and stop block 90 to the underside of the plate 88. The block 90 is of substantial thickness and is apertured to receive the rod or shaft 58 with a sliding fit. Extending forward from the carriage 84, and welded thereto, is a guide rod 91, which slides in a guide 93 that is welded to the underside of the plate 88. Thus, rocking of the crank 50 produces reciprocation of the carriage 84, the forward limit being fixed by the setting of the thumb nuts 54 and 56. Extending forwardly from the carriage 84, and secured thereto by welding is a rack 92. The teeth 94 of the rack 92 engage a pinion 96 which is affixed by keys 95 to a bushing 97 which is rotatable on a stud 98 secured to the plate 88. A second pinion 100 is affixed by keys 99 to the bushing 97 to rotate therewith. The bushing 97 is held in place on the stud 98 by a nut 101, and the pinions 96 and 100 are supported by a washer 103. As the forwardly extending rack 92 rotates the pinion 96, the pinion 100 is likewise rotated. The pinion 100 engages a laterally extending rack 102 that is supported by a sheet metal slide 104, which is welded to the under surface of the slide 104 (an extension 107 being welded to the plate 88) and extends rearwardly and forwardly to support and guide the rack 92. Atop one end of the rack 102 is welded a channel-shaped slide 108, which extends transversely of the rack 102 and thus rearwardly and forwardly of the housing 20. A rod 110 is slidably disposed in the guide or channel 108. At the rear end of the rod 110 is a screw 112 threaded into the end of the rod 110. Compressed between a washer 114 under the head of the screw 112 and the slide 108 is a spring 116. From the underside of the rod 110 at the forward end thereof extends a small pin or stop 118 which prevents the rod 110 from moving rearwardly in response to the urging of the spring 116. Secured, as by welding, to the forward end of the rod 110 is the support post 40 which extends up through the slot 42. As the carriage 84 is moved forwardly by the operation of the crank 50, the pinion 96, which is operated by the rack 92, turns the gear 100 which drives the rack 102, thereby moving the channel or slide 108 and the support post 40 laterally along the portion 44 of the slot 42.

The rear portion of the rack 92 has no teeth thereon. When the support post 40 reaches its innermost lateral position (shown in Fig. 12) the pinion 96 becomes disengaged from the rack 92, as shown in Fig. 14, and further motion of the rack 92 accordingly does not move the support post 40 further laterally. Simultaneously with the disengagement of the pinion 96 from the rack 92 by reason of the absence of teeth on the rearward portion of the rack 92, the carriage 84 abuts against the head of the screw 112 and further motion of the carriage imparted by the remainder of the stroke of the crank 50 pushes the rod 110 forward through the slideway or channel 108, which is now stationary.

The stem 68 of the support and pusher 66 is secured by a screw 120 to the forward end of a rod 122, which passes through a guide 124 secured to the under surface of the plate 88. A coiled spring 126 is compressed between the guide 124 and a screw 128 and washer 130 at the rear end of the rod 122 in a manner similar to the spring 116. The screw 128 is engaged by the carriage 84 at the same point in the stroke of the crank 50 as is the screw 112. Thus, simultaneously with the commencement of progression of the support post 40 along the forwardly extending portion 46 of the slot 42, the support and pusher eyelet 66 is being driven along the slot 64.

It will be noted that the pusher 66 and the support post 40 are at all times during the operation of the machine in alignment laterally across the machine. Thus, there is at no time any differential between the forces applied to the two ends of the finger-engaging member 48, which thus substantially reduces the probability of bending or other misadjustment of the finger-engaging member 48 in use of the machine.

A return tension spring 132 is connected between a pin 134 secured to the rack 92 and a tie rod 136 which extends across the back of the housing. A second spring 138 connects the tie rod 136 to the link 78 to return the link 78, and thus the crank 50, to their rest or quiescent positions. Thus, on release of the crank 50 by the operator, the carriage 84 returns to its original position wherein it abuts against the stop 90. In the first portion of this return travel the rods 122 and 110, under the influence of springs 126 and 116, respectively, return the support post 40 and the eyelet 66 to their rearward positions. At this point the teeth of the rack 92 again engage the pinion 96, thus moving the rack 102 laterally to its rest position, and withdrawing the finger-engaging member 48 from the eyelet 66 and from the rings of the inserted binder.

There is illustrated in the drawing and described above a single embodiment of the invention. It will readily be understood that persons skilled in the art will devise, in pursuance to the teachings of the present invention, many other embodiments which, although they may differ in appearance and in detail from that herein disclosed, nevertheless incorporate some or all of the inventive features of the described embodiment. Accordingly, the invention shall not be deemed to be limited by the particular embodiment chosen for illustration and description, but shall be deemed to be defined only by the appended claims.

What is claimed is:

1. A binding machine of the class described comprising a binder-holder, an elongated finger-engaging member, a support rigidly secured to the finger-engaging member and positioning the member at one side of the binder-holder, a second support near the opposite end of the binder-holder shaped to receive the finger-engaging member, an actuating member, means responsive to the actuating member to drive the first support in the direction parallel with the binder-holder to seat the finger-engaging member in the second support, and mechanism responsive to said actuating member to move both supports away from the binder-holder to uncurl the binder following the seating of said finger-engaging member in said second support.

2. In a binding machine, a binder-holder adapted to hold a binder comprising a plurality of curled resilient fingers, a rack extending parallel with the binder-holder, a finger-engaging member supported on the rack for movement therewith parallel to said binder holder, said finger-engaging member being movable transversely of the rack, a pinion engaging the rack, mechanism for operation of the pinion to move the finger-engaging member past the holder, and mechanism to drive the finger-engaging member with respect to the rack in the direction away from the holder.

3. In a binding machine of the class described, an elongated finger-engaging member adapted to extend through several binder fingers, a first support member rigidly secured to the finger-engaging member, a second support member spaced from the first support member and shaped to receive the end of the finger-engaging member, an actuation member, and means responsive to the actuation member to move the first support member toward the second support member to engage the finger-engaging member in the second support member and thereafter to move both support members in a direction perpendicular to said motion of the first support member.

4. In a binding device for the insertion of binders having a plurality of resilient curled fingers, a binder-holder means for supporting said binders, an elongated finger-engaging member of a length to extend linearly through a plurality of binder fingers, a movable member and means for constraining the movable member for movement longitudinally of the binders to be supported by said binder-holder, means for coupling the longitudinal movement of said movable member to said finger-engaging member, an actuating member, lost-motion mechanism responsive to said actuating member for longitudinally moving said movable member and the connected finger-engaging member into a position where a portion of said finger-engaging member extends through the binder fingers, whereupon the longitudinal movement of said movable member is terminated, a carriage connected to said actuating member for movement thereby and means for constraining the movement of said carriage transversely of the binders, and motion-imparting means connected to and movable with said finger-engaging member and in the path of movement of said carriage when the attached finger-engaging member has been extended through the binder fingers, said motion-imparting means being movable by the carriage in a direction to move the attached finger-engaging means away from the binder-holder means to uncurl the binder fingers.

5. In a binding device for the insertion of binders having a plurality of resilient curled fingers, a binder-holder for supporting said binders, an elongated finger-engaging member of a length to extend linearly through a plurality of binder fingers, a movable member and means for constraining the movable member for movement longitudinally of the binders to be supported by said binder-holder, a slide on said movable member which extends transversely of said binders, motion-imparting means supported in said slide for movement relative to said movable member in a direction transversely of the binders, the walls of said slide engaging said motion-imparting means so as to move the same longitudinally with said movable member, means fixedly connecting said finger-engaging member to said motion-imparting means, an actuating member, lost-motion means responsive to said actuating member for longitudinally moving said movable member into a position where said finger-engaging member extends through the binder fingers, whereupon the movement of said movable member is terminated and a carriage movable transversely of the binders and connected to said actuating member for movement thereby, said motion-imparting means being in the path of movement of said carriage when the attached finger-engaging member has been extended through the binder fingers, and being movable by the carriage in a direction to move the attached finger-engaging member away from the binder-holder to uncurl the binder fingers.

6. In a binding machine for uncurling the fingers of a binder of the type having a plurality of spaced apart resilient curled fingers, said machine having a binder-holder and a finger-uncurling rod of a length sufficient to span at least two successive curled fingers of a binder supported by said holder, the improvement comprising an actuating member, a carriage, carriage actuating means for moving the carriage transversely of the binder-holder in response to the movement of said actuating member, a movable member and means for constraining the movable member for movement in a direction parallel to said binder-holder, a slide extending transversely of said binder-holder and carried by said movable member, motion-imparting means connected to said finger-uncurling rod and being slidable within said slide in a direction transversely of said binder-holder and movable therewith in a direction parallel to said holder, and a lost motion mechanism extending between said carriage and said movable member for imparting longitudinal movement to said movable member in response to the movement of the carriage until the finger-uncurling rod has been moved into a position where it extends through said binder fingers, said motion-imparting means being in the path of movement of the carriage when the attached finger-uncurling rod is in said position so as to be movable by the carriage transversely of said binder-holder to effect the uncurling of the binder fingers by the attached finger-engaging rod.

7. In a binding machine for uncurling the fingers of a binder of the type having a plurality of spaced apart resilient curled fingers, said machine having a binder-holder, and a continuous finger-uncurling rod of a length sufficient to span at least two successive curled fingers of a binder supported by said holder, the improvement comprising mechanism for moving said finger-uncurling rod successively into the curled fingers of a binder and then transversely of the binder-holder to uncurl the fingers, said mechanism comprising an actuating member, a carriage, carriage actuating means responsive to the movement of the actuating member for moving the carriage transversely of said binder-holder, a movable member movable in a direction parallel to said binder-holder in response to the movement of said actuating member, and means for coupling the movement of said movable member to said finger-uncurling rod, said means including a motion-imparting means connected to said finger-uncurling rod and movable into the path of movement of said carriage when the rod has been moved into a position where it extends through said binder fingers, and said motion-imparting means being movable by said carriage transversely of said binder-holder so as to effect the separation of the finger-uncurling rod from the binder-holder.

8. In a binding machine for uncurling the fingers of a binder of the type having a plurality of spaced apart resilient curled fingers, said machine having a binder-holder, and a continuous finger-uncurling rod of a length sufficient to span at least two successive curled fingers of a binder supported by said holder, the improvement comprising mechanism for moving said finger-uncurling rod successively into the curled fingers of a binder and then transversely of the binder-holder to uncurl the fingers, said mechanism comprising an actuating member, a carriage, means responsive to the actuating member for moving the carriage transversely of said binder-holder, said carriage carrying a toothed rack which extends transversely of the binder-holder, a pinion adapted to mesh with said rack, and a second toothed rack coupled to the pinion for movement thereby in a direction parallel to said binder-holder, said finger-uncurling rod being movable by said second rack into the curled fingers of a binder, the teeth of one of the racks being adapted to become disengaged from said pinion when the finger-uncurling rod has been moved into the curled fingers of the binder, and means for coupling the transverse movement of said carriage to said finger-uncurling rod upon the disengagement of one of said racks from said pinion.

References Cited in the file of this patent

UNITED STATES PATENTS

| | | |
|---|---|---|
| 2,304,630 | Emmer | Dec. 8, 1942 |
| 2,334,433 | Nelson et al. | Nov. 16, 1943 |
| 2,334,589 | Spinner | Nov. 16, 1943 |
| 2,593,805 | Spinner | Apr. 22, 1952 |